(12) United States Patent
Becker

(10) Patent No.: US 12,362,953 B2
(45) Date of Patent: Jul. 15, 2025

(54) DEVICE FOR OPERATION IN A NETWORK, AUTOMATION SYSTEM AND METHOD FOR OPERATING THE AUTOMATION SYSTEM

(71) Applicant: Turck Holding GmbH, Halver (DE)

(72) Inventor: Friedrich Becker, Lemgo (DE)

(73) Assignee: Turck Holding GmbH, Halver (DE)

( * ) Notice: Subject to any disclaimer, the term of this patent is extended or adjusted under 35 U.S.C. 154(b) by 0 days.

(21) Appl. No.: 18/817,379

(22) Filed: Aug. 28, 2024

(65) Prior Publication Data

US 2025/0080368 A1    Mar. 6, 2025

(30) Foreign Application Priority Data

Aug. 29, 2023  (DE) ............... 10 2023 123 139.1

(51) Int. Cl.
*H04L 12/10*       (2006.01)
(52) U.S. Cl.
CPC .................. *H04L 12/10* (2013.01)
(58) Field of Classification Search
None
See application file for complete search history.

(56) References Cited

U.S. PATENT DOCUMENTS

| | | | |
|---|---|---|---|
| 2010/0231054 A1 | 9/2010 | Togawa | |
| 2017/0185556 A1 | 6/2017 | Büttner et al. | |
| 2018/0024620 A1* | 1/2018 | Gardner | H04L 12/40045 713/323 |
| 2019/0342123 A1 | 11/2019 | Bhagwat | |
| 2021/0367796 A1* | 11/2021 | Aslami | H03H 7/0115 |
| 2022/0116236 A1* | 4/2022 | Huang | H04L 12/10 |

FOREIGN PATENT DOCUMENTS

| | | |
|---|---|---|
| DE | 10 2015 116 800 B3 | 12/2016 |
| DE | 10 2021 119 786 A1 | 2/2023 |
| EP | 3 236 615 B1 | 8/2018 |
| JP | 2022147202 A | 10/2022 |

OTHER PUBLICATIONS

Search Report issued in DE 10 2023 123 139.1, to which this application claims priority, mailed Apr. 18, 2024 (English-language machine translation attached).
Search Report issued in EP 24 196 370.1, which is a counterpart hereof, with a date of issued of Jan. 24, 2025 (English-language machine translation attached).

* cited by examiner

*Primary Examiner* — Fahmida Rahman
(74) *Attorney, Agent, or Firm* — Tautz & Schuhmacher LLC; Michael McCandlish; Georg Hasselmann

(57) ABSTRACT

A device for operation in a network, wherein a first interface is connected to a second interface via a two-core through line, which has a first line core and a second line core; wherein a supply unit is connected to the two-core through line via a first, input-side node pair and a line branch; wherein a data and electronic unit is arranged via a node pair in the line branch leading to the supply unit and via an output-side line and a second, output-side node pair parallel to the through line; wherein at least one first push-pull choke is arranged as a low-pass filter in the line branch between the node pair and the supply unit; and wherein a second push-pull choke is arranged as a low-pass filter in the through line between the first, input-side node pair and the second, output-side node pair.

7 Claims, 2 Drawing Sheets

DEVICE FOR OPERATION IN A NETWORK, AUTOMATION SYSTEM AND METHOD FOR OPERATING THE AUTOMATION SYSTEM

CROSS REFERENCE TO RELATED APPLICATIONS

This application claims priority to German patent application 10 2023 123 139.1 filed on Aug. 29, 2023, which is hereby incorporated by reference in its entirety.

TECHNICAL FIELD

The present disclosure relates to a device, an automation system and a method for operating the automation system.

BACKGROUND

Single Pair Ethernet (SPE) devices may be connected in series. The data signal may be separated from the supplying direct current on the input side of each device in the series. It may be reapplied to the direct current on the output side. In the case of such a line topology in an SPE network having Power over Dataline (PoDL), the electrical supply is forwarded, regardless of the aforementioned decoupling of the data or of the data signal.

EP 3 236 615 B1 discloses an arrangement in which all elements are connected in series in a ring circuit. In this case, the high-frequency data signal is forwarded via a coupling unit comprising capacitors. The signal component is separated from the supply current for transmission in a bypass supply line via two high-pass filters, which are arranged on the input and output sides in the SPE device.

In this arrangement signal filtering may be structurally complex.

It may be one object of the present disclosure to propose an improved SPE device and a simplified method.

SUMMARY

A device for operation in a network, wherein the network is designed as a two-wire network with Power over Dataline and wherein the network includes a sensor, an actuator, a transmitting unit, a receiving unit, and/or any other electronic device. The device comprises at least one first, input-side interface, at least one second, output-side interface, a supply unit, a functional unit, and a data and electronic unit. The data and electronic unit includes a processor unit, an input-side physical layer, an output-side physical layer, an input-side coupling unit and an output-side coupling unit. The first interface is connected to the second interface via a two-core through line, which has a first line core and a second line core. The supply unit is connected to the two-core through line via a first, input-side node pair and a line branch. The data and electronic unit is arranged via a node pair in the line branch leading to the supply unit and via an output-side line and a second, output-side node pair parallel to the through line. At least one first push-pull choke is arranged as a low-pass filter in the line branch between the node pair and the supply unit. A second push-pull choke is arranged as a low-pass filter in the through line between the first, input-side node pair and the second, output-side node pair.

An automation system, comprising a Single Pair Ethernet network having power over Dataline, at least one Powering Source Equipment and multiple powered devices, wherein the at least one Powering Source Equipment and at least one of the multiple powered devices are connected to one another via the Single Pair Ethernet network, and wherein the at least one of the multiple powered devices is a device as described above, and is connected in series to at least one further device and/or at least another one of the multiple powered devices.

A method, the method comprising operating the automation system.

BRIEF DESCRIPTION OF THE DRAWINGS

Further optional details of the disclosure will now be explained in more detail below and with reference to exemplary and thus optional embodiments shown in the drawings.

In the drawings.

DESCRIPTION OF EXEMPLARY EMBODIMENTS

Figure 1:
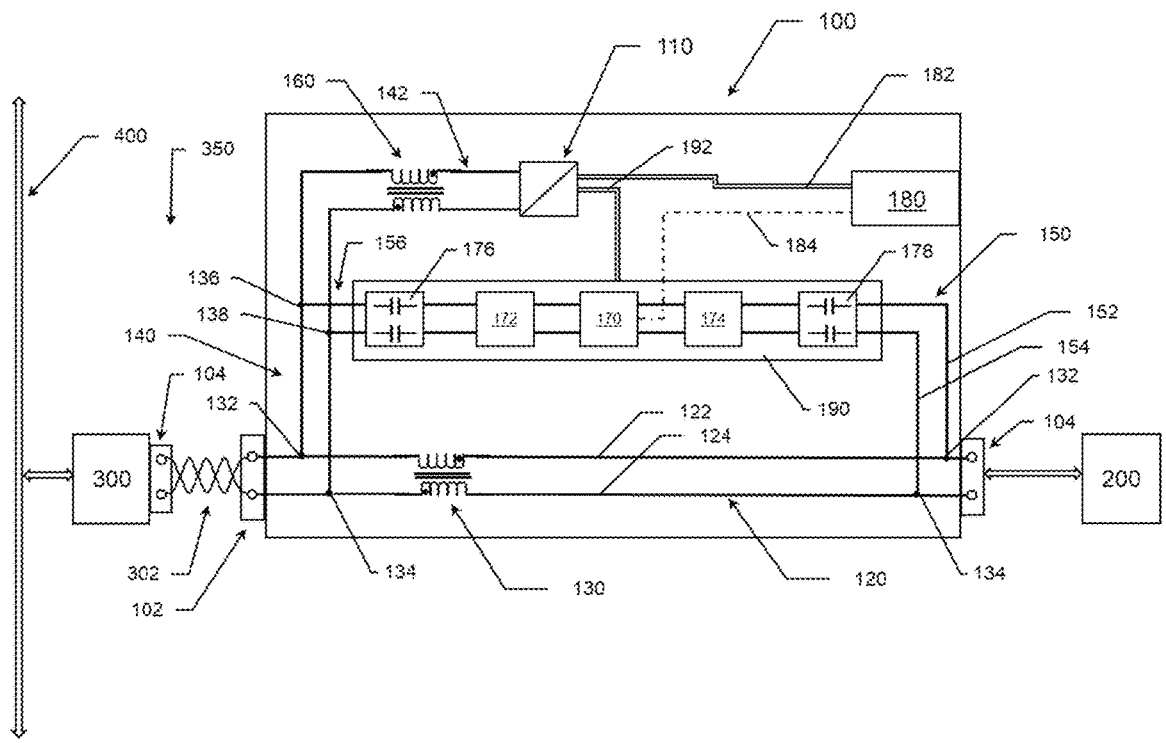
FIG. 1 shows a first embodiment of a device as a schematic circuit diagram.

A device for operation in an SPE network is disclosed, which can comprise a sensor, an actuator, a transmitter and/or receiver unit or any other electronic device. The network is a two-wire network which may be designed as an SPE network having Power over Dataline (PoDL). In this case, the device comprises at least one first, input-side interface and at least one second, output-side interface. The device comprises moreover a supply unit, a functional unit and an electronic unit. The electronic unit comprises in this case the following: a processor unit, an input-side PHY designed as an SPE physical layer (PHY), an output-side PHY designed as an SPE physical layer (PHY), an input-side coupling unit and an output-side coupling unit. In this case, the first interface is connected to the second interface via a two-core through line which has a first line core and a second line core. The supply unit is connected to the two-core through line via a first, input-side node pair and a line branch. The electronic unit is arranged parallel to the through line and for this purpose is connected to the through line on the input side via a node pair in the line branch leading to the supply unit and on the output side via a line there and a second, output-side node pair.

Furthermore, at least one first push-pull choke is arranged in the line branch between the node pair there and the supply unit, wherein the push-pull choke is designed as a low-pass filter. In the through line, a second push-pull choke is arranged as a low-pass filter between the first, input-side node pair and the second, output-side node pair.

This may greatly reduce the cost and size for the through line of the DC supply component. Thus, a rectifier may not be required in the through line, the energy path. In this manner, the total resistance of a device can be reduced by up to 25% compared to a comparable PD in which two push-pull chokes are arranged in the through line, so that the total voltage drop is minimized.

The push-pull choke can be designed in different forms and is also known as a differential mode choke (DMC) or feed-through choke. As explained above, it is used as a low-pass filter for filtering (suppressing) the high-frequency (data) signal so that only the pure direct current signal or the pure direct current component remains in the respective line or the two-line cores.

The device can have its own housing in which the components mentioned are enclosed. In the present case, a "device" is to be understood as the component in accordance with the disclosure that has the aforementioned through line and arrangement of the push-pull choke. In contrast to this, a powered device (PD) is to be understood as a sensor or actuator that does not have this arrangement.

The functional unit is determined by the device in its basic function and vice versa. The functional unit is to be broadly provided and can be an actuator head, a sensor head, an LED, an LED group, any other emitter and/or receiver, wherein usability in connection with an SPE is required, which is also understood to include upgrading within the device, using suitable components, optionally electronic or microelectronic units.

In a point-to-point network, such as an SPE network, current and data flow in both directions or are sent in both directions. In the present case, for the sake of linguistic simplification, the side of the device that is connected to the higher-level central network or is intended for this purpose is referred to as the "input side" and the associated interface as the "IN" interface. In a similar manner, the side of the device that is facing away from the higher-level central network is regarded as the "output side" and the associated interface as the "OUT" interface. The above applies in a similar manner for devices connected to each other in series or connected powered devices (PD), the above applies analogously.

In this sense, there is in a similar manner an "UP direction", a "DN direction", in that the main direction of signal forwarding in the UP direction leads from the input side to the output side, while in the DN direction the main direction of signal forwarding leads from an output-side interface to an input-side interface. In a similar manner, an input-side node pair is closer to the first, input-side interface than to the second, output-side interface of the device, etc.

Without the intention of restriction or limitation, this type of designation is used to clarify the language, unless something different or limiting is expressly expressed.

Furthermore, the term "node pair" and, where applicable, the doubling of reference signs are used synonymously to designate a pair of the two associated (individual) nodes with the same reference signs on the associated two cores of the same line and vice versa.

The named "electronic assembly" is not to be understood as constructively restrictive. It can comprise both a group of mentioned electronic units arranged on a common printed circuit board, possibly with further components, as well as the functional unit or parts of the functional unit. The "electronic assembly" is also meant when the components mentioned and possibly others are arranged, grouped and/or attached in or to the device in any other way.

The device itself is an SPE device and is designed for integration into an SPE network having PoDL and/or a corresponding two-wire line.

Optionally, the supply unit is designed to provide the required power for the functional unit and/or the processor unit. As a rule, any power and/or current requirement of the device may be provided via the supply unit. The processor unit comprises at least one microprocessor (μC). It can comprise further μCs, data memories and/or switches.

An embodiment can be that the ratio of a nominal current of the first push-pull choke in the line branch to a nominal current of the second push-pull choke in the through line is less than or equal to 0.5, optionally less than or equal to 0.25. Ideally, the nominal current of the first push-pull choke in the line branch is equal to or less than 10% of the nominal current of the push-pull choke in the through line leading from the input-side interface to the output-side interface.

In other words, the first push-pull choke does not have the same dimensions as the second push-pull choke, but rather the first push-pull choke is smaller than the second push-pull choke, at least in terms of construction volume. This means that, optionally, only one choke has to be designed for the total current, while the other choke only has to be designed for the individual current of the first interface connection.

A further embodiment can be that at least one switching unit is arranged in the through line in order to switch at least one of the two line cores.

The switching unit is optionally switched by the processor unit or a μC of the processor unit. Optionally, control is performed via a connected control line. The switching unit itself is not restricted; it can, for example, be designed as a field-effect transistor (FET) or any other microelectronic switching element, optionally an opto-FET.

Thus, the supply unit may be designed as a switching regulator for voltage and/or current conversion.

It may be provided that the supply unit comprises a periodically operating electronic switch and at least one energy storage device. Optionally, the supply unit can generally be designed as a direct voltage converter (DC/DC), as a potential-isolating or non-isolating unit. Since a higher voltage is present on the through line than is required for the device, the supply unit may be designed as a step-down converter or buck converter, which provides a lower direct current voltage for the device than is present at the input from the line branch.

The disclosure further comprises an automation system which is designed as a Single Pair Ethernet (SPE) having Power over Dataline (PoDL), which comprises at least one Powering Source Equipment (PSE) and a plurality of powered devices (PD), wherein at least one PSE and at least one PD are connected to each other via the SPE network, wherein at least one PD is or is designed as a device which is designed according to one of the variants or embodiments as described above, wherein this device is connected in series to at least one further device and/or at least one PD.

An input side, an output side, an UP direction and/or a DN direction are mentioned for the device and/or the series of an SPE network or SPE network section. Without any intention of restriction or limitation, this designation is used to clarify the language, as it is known that transmission takes place in both directions in an SPE network.

Optionally, the automation system is connected to one or more of the following higher-level and optionally central networks or systems: an Enterprise Resource Planning (ERP), a Manufacturing Execution System (MES), Supervisory Control and Data Acquisition (SCADA) and/or Programmable Logic Controller (PLC).

Optionally, at least one PSE is connected to one of the aforementioned systems, wherein the PSE is/are connected in series to at least one device and at least one PD, multiple devices and at least one PD.

The disclosure also includes a method for operating an automation system having PoDL, wherein the automation system having PoDL is designed according to one of the aforementioned embodiments and variants.

All aspects and advantages of the device may apply identically or in a similar manner to the automation system and/or the method for operating the automation system and vice versa, unless something different or restrictive is expressly stated.

The automation system and the associated method may be used in the field of process automation of treatment or production systems for (process) media and/or workpieces.

One or more devices may be switched off at least temporarily in a method step by means of the switching unit of a device. It remains possible for the switching device to feed (data) signals back or through to the PSE via the second line core.

In this case, the switching, active device may be the last active device in the chain of devices connected in series, so that all devices between the last, active device and the PSE are switched on and all subsequent devices and PD arranged on the output side are switched off.

The method step, in which a device switches off at least one subsequent and series-connected device or PD, may be an analysis and/or initialisation step that is carried out when the network or part of the network is started. This analysis and/or initialisation step may be used to determine and report back the power class of the respective device, which causes the PD and/or devices downstream in the current direction to be switched off.

Optionally, the switching unit is designed with and/or connected to an energy storage device in such a manner that at least the initialisation protocol and the data relating to the power class can be sent in the DN direction, optionally to the PSE and/or a gateway module.

It should also be pointed out that, in the context of the present patent application, indefinite articles and indefinite numerals such as "one . . . ", "two . . . " etc. are generally to be understood as at least indications, i.e. as "at least one . . . ", "at least two . . . " etc., unless it is clear from the context or the specific text of a particular passage that only "exactly one . . . ", "exactly two . . . " etc. are meant there.

FIG. 1 shows a greatly simplified, higher-level network 400 comprising a PSE 300 and a device 100 as SPE, which are connected to each other via a two-wire line 302 and form the actual SPE network 350 or the SPE network section.

In the present case, the higher-level network 400 is a data bus network, such as a CAN bus or a Profibus or Ethernet network, but in an alternative embodiment it can also be designed as an IO-Link or SPE network. In the example shown, the route from the PSE 300 with the two devices 100, 200 forms the SPE network. The two devices 100, 200 are designed in a similar manner as described below for the device 100 and in series to each other. In the present case, the device 100 is designed as a thermal sensor and the device 200 as an inductive proximity sensor.

The device 100 comprises on the input side an SPE interface 102 and on the output side a further SPE interface 104. Even if current and data flow are sent in both directions in a point-to-point network such as an SPE network 350, the side of the device 100 that is connected to the PSE 300 or is intended for this purpose is to be regarded below as the input side and the associated interface as the 'IN' interface 102. Similarly, the side of the device 100 that is not intended for this purpose and/or the circuitry of the device 100 that is not designed in order to be connected to the PSE 300 or to form the current and/or data input side is to be regarded as the output side and the associated interface as the 'OUT' interface 104. The above applies in a similar manner to mutually connected devices 100, 200 or the PD 202.

In the present case, the device 100 is designed as a temperature sensor and has a thermal element as a functional unit 180. It has a first, input-side interface 102 and a second, output-side interface 104, a supply unit 110, the aforementioned functional unit 180 and an electronic unit 190. In the embodiment example shown, this electronic unit 190 is a printed circuit board which comprises the following: a processor unit 170 having at least one CPU and, if required, one or more switching units, an input-side SPE PHY 172, an output-side SPE PHY 174 and, for receiving and transmitting the high-frequency (digital) signal, an input-side coupling unit 176 and an output-side coupling unit 178.

The components of the electronic unit 190 are optionally arranged on a common printed circuit board, wherein in an embodiment example not shown the functional unit 180 could also be arranged on the one common printed circuit board and/or the first push-pull choke 160 can also be arranged on the printed circuit board.

The supply unit 110 is a direct current voltage source, which is designed as a switching regulator and is used as a voltage source for all components of the device 100, optionally for the functional unit 180 via the supply line 182 and for the electronic unit 190, which is designed as a printed circuit board, via the supply line 192. The communication of the functional unit 180 for controlling and transmitting measured values with the processor unit 170 takes place via the data line 184 shown as a dotted-dashed line. In the present case, a functional unit 180 is shown which communicates with the one processor unit 170 and is controlled by it. In the case of an embodiment variant not shown, two or more functional units 180 are provided, such as for example a thermal element and a group of LEDs, wherein one of the two functional units 180 may have its own µC, which in turn communicates with the processor unit 170.

The two interfaces 102, 104 are connected to the respective ports of the same type via a two-core through line 120, optionally via the choke 130.

Furthermore, the supply unit 110 is connected to the through line 120 via a first (input-side) node pair 132, 134 and a line branch 140.

The electronic unit 190 which may be designed as a printed circuit board is integrated into the circuitry of the device 100 parallel to the through line 120. For this purpose, the input-side coupling unit 176 of the electronic unit 190 is connected to the line branch 140, which leads to the supply unit 110, via a two-core line section 156 and the node pair 136, 138. Furthermore, the output-side coupling unit 178 of the electronic unit 190 is connected to the output-side node pair 132, 134 of the through line 120 via the two-core line 150. The line 150 has line cores 152, 154 which are connected to the associated line cores 122, 124 of the through line 120 via the aforementioned, output-side nodes 132, 134.

The device 100 now has two push-pull chokes 130, 160, also known as differential mode chokes (DMC) or feed-through chokes, which are used to filter the high-frequency signals and thus also the respective pure direct current signal to pass through.

The first push-pull choke 160 is arranged in the line branch 140, between on the one hand the node pair 136, 138 leading to the line section 156 and the input-side coupling unit 176 and on the other hand the supply unit 110, so that only the pure direct current signal without differential component arrives at the supply unit 110. The supply unit 110 is electrically connected to the first push-pull choke 160 via the line section 142.

A second push-pull choke 130 is likewise used as a low-pass filter and is arranged in the connecting line 120 between the input-side node pair 132, 134 and the output-side node pair 132, 134. Consequently, a pure direct current signal arrives at the output-side node 132 via the first line core 122 of the connecting line 120 and the digital signal component is impressed on the node 132. In a similar manner, a pure direct current signal arrives at the input-side node 134 via the second line core 124 and the digital signal component coming from the input-side coupling unit 176 is impressed on the input-side node 134 via the second line core 124 and forwarded onto the PSE 300.

As can be clearly seen in the embodiment example shown in FIG. 1, only the current directly required for the device 100 flows via the first push-pull choke 160, so that in the present case of a thermal element, the first push-pull choke 160 is only designed for a nominal power of 1 watt.

The entire current of the SPE network flows via the second push-pull choke 130, so that it must be correspondingly larger and is designed primarily for a nominal power of 12 watts. As a first approximation, the construction size correlates with the nominal power rating for the same type, so that the construction volume of the first push-pull choke 160 is only 1/12 of the size of the second push-pull choke 130.

Figure 2:
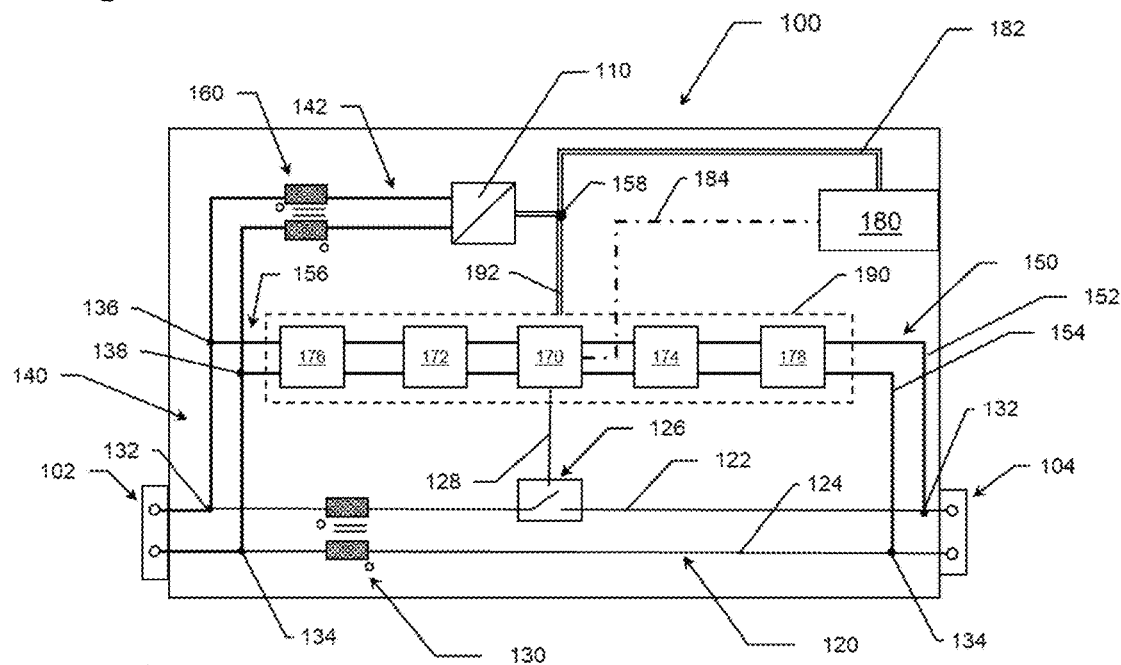
FIG. 2 shows a further embodiment of a device.

In the embodiment according to FIG. 2, which largely corresponds to that of FIG. 1, the functional unit 180 and the processor unit 170 are connected to the supply unit 110 via a line node and a common line section. The main difference to the embodiment of FIG. 1 is that a switching element 126 is provided in the through line 120. The switching element 126 is connected to the processor unit 170 via a control line 128, via which the switching element 126 can be switched. The switching element 126 can be designed as an FET and is used to interrupt the first line core 122 of the through line 120, into which it is integrated, so that subsequent and series-connected devices can be deactivated. In the embodiment example shown in FIG. 2, the electronic unit 190 is only a grouping of the electronic units and elements, which are not arranged on a common printed circuit board but are mounted in some other way within the device 100 and are conductively connected to one another.

Figure 3:
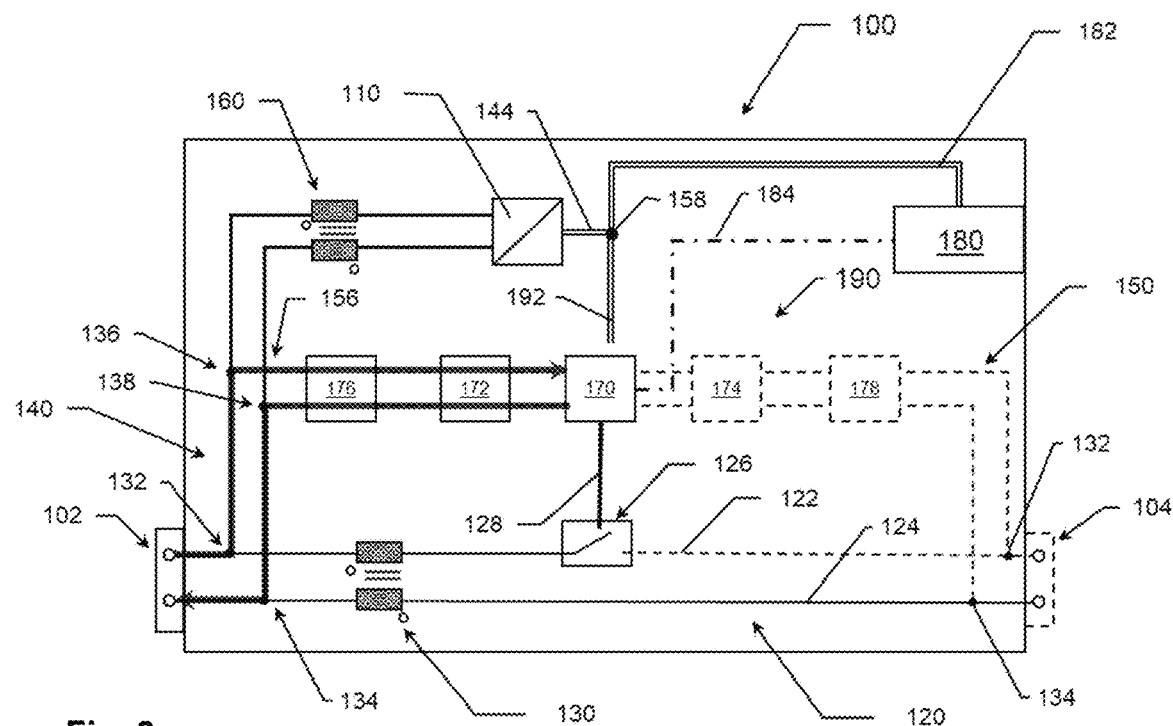
FIG. 3 shows the device according to FIG. 2 with a first signal path.

FIG. 3 shows the embodiment of the device 100 in this switching state, in which the first line core 122 of the through line 120 is interrupted by the switching element 126. This switching state may be used for a self-diagnosis and/or initialization step of the device 100 as such, because interfering influencing variables or unknown effects of other devices, modules and units, as well as other devices 100, 200 or PD 202, are largely excluded.

The deactivated elements are shown as dashed lines. Wider lines and arrows show a signal or data flow which leads to the input side coupling unit 176 via the input side interface 102, the node 132, the line branch 140 and the node 136, wherein the high frequency signal is forwarded to the input side SPE PHY 172 and subsequently transmitted to the processor unit 170.

The processor unit 170 utilizes this input signal (input protocol) and creates an output signal (output protocol) with supplementary analysis data and forwards this in the reverse direction, as shown. In other words, in this case, the forwarding takes place via the SPE PHY 172, the coupling unit 176, to the node 138 in the line branch 140 and the node 134 in the second line core 124 of the supply line 120 and to the input-side interface 102.

Figure 4:
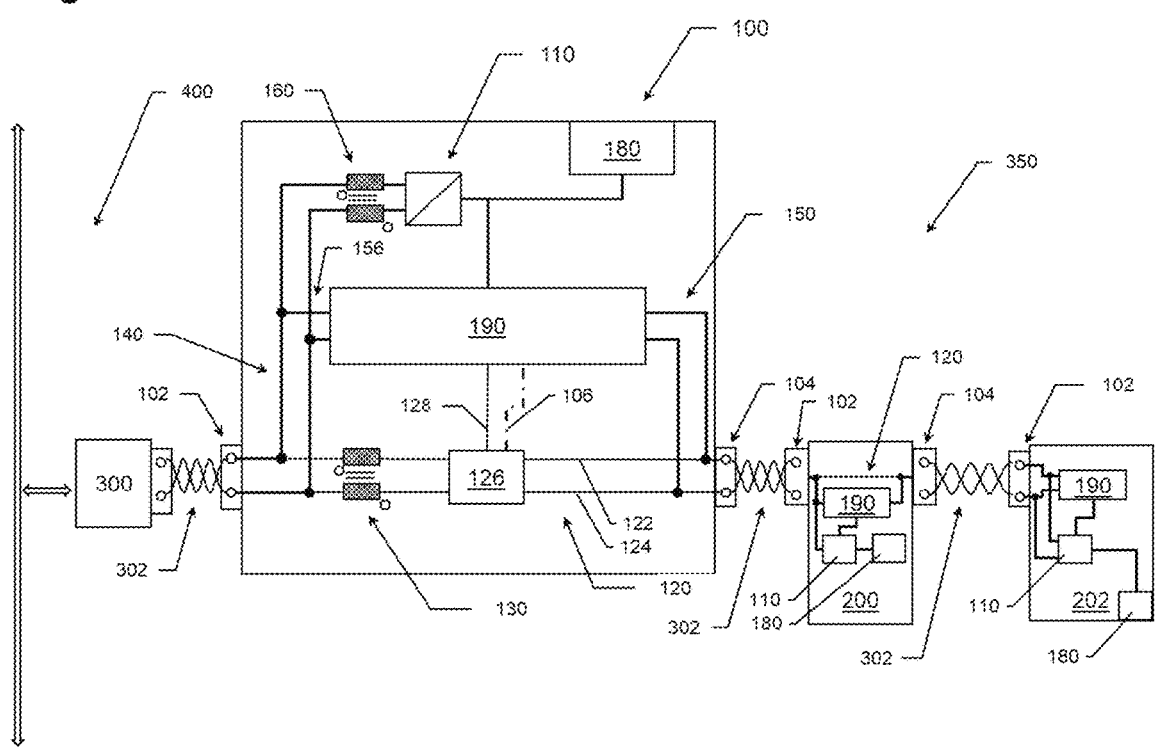
FIG. 4 shows a group of devices in a third embodiment.

In the case of the embodiment example of FIG. 4, the SPE network consists of a PSE 300, a device 100 having a through line 120, a second device 200 that is identical to the device of FIG. 1 and a PD 202 according to the prior art without a similar through line 120. The PSE 300, the devices 100, 200 and the PD 202 are connected in series to each other and connected via two wire lines 302. The PSE 300 is connected to a central, higher-level communication network 400, which in the present case is an IO-Link or an Ethernet.

The device 100 has a switching element 126 which differs from the embodiment example of FIGS. 2-4 which is designed in a manner not shown in detail in order to switch both line cores 122, 124 of the through line 120 as required, for which purpose it is connected via the control line 128 and/or a data line 106 to the processor unit 170, not shown of the electronic unit 190 and can be controlled via this.

LIST OF REFERENCE CHARACTERS

100 Device
102 Interface SPE ("IN")
104 Interface SPE ("OUT")
106 Data line
110 Supply unit (power supply)
120 Through line
122 First line core
124 Second line core
126 Switching unit
128 Control line
130 Push-pull choke
132 Node (in the first line core 122)
134 Node (in the second line core 124)
136 Node
138 Node
140 Line branch
142 Line section
144 Supply line, central
150 Line (output-side 190)
152 Line core
154 Line core
156 Line section (input-side 190)
158 Node (in 144, 192)
160 Push-pull choke)
170 Processor unit (CPU and switch)
172 PHY (left)
174 PHY (right)
176 Coupling unit
178 Coupling unit
180 Functional unit
182 Supply line (from 180)
184 Data line
190 Electronic unit
192 Supply line
194 Switching element
200 Device
202 Powered device
300 Powering Source Equipment (PSE)
302 Two-wire line (SPE)
350 SPE network, SPE network section
400 Network central

What is claimed is:

1. A device for operation in a network, wherein the network is designed as a two-wire network with Power over Dataline and wherein the network includes a sensor, an actuator, a transmitting unit, a receiving unit, and/or any other electronic device, wherein the device comprises:

at least one first, input-side interface, at least one second, output-side interface, a supply unit, a functional unit, and a data and electronic unit, wherein the data and electronic unit includes a processor unit, an input-side physical layer, an output-side physical layer, an input-side coupling unit and an output-side coupling unit, wherein the first interface is connected to the second interface via a two-core through line, which has a first line core and a second line core, wherein the supply unit is connected to the two-core through line via a first, input-side node pair and a line branch, and wherein the data and electronic unit is arranged via a node pair in the line branch leading to the supply unit and via an output-side line and a second, output-side node pair parallel to the two-core through line, wherein at least one first push-pull choke is arranged as a low-pass filter in the line branch between the node pair and the supply unit, and wherein a second push-pull choke is arranged as a low-pass filter in the through line between the first, input-side node pair and the second, output-side node pair, wherein a ratio of a nominal current of the first push-pull choke in the line branch to a nominal current of the second push-pull choke in the two-core through line is less than or equal to 0.5.

2. The device according to claim 1, wherein the device comprises at least one switching unit being arranged in the two-core through line and designed to switch at least one of the two line cores.

3. The device according to claim 1, wherein the supply unit is a switching regulator.

4. The device according to claim 3, wherein the switching regulator is designed for voltage and/or current conversion.

5. An automation system, comprising a Single Pair Ethernet network having Power over Dataline, at least one Powering Source Equipment and multiple powered devices, wherein the at least one Powering Source Equipment and at least one of the multiple powered devices are connected to one another via the Single Pair Ethernet network, and wherein the at least one of the multiple powered devices is a device according to claim 1, and is connected in series to at least one further device and/or at least another one of the multiple powered devices.

6. A method for operating the automation system according to claim 5, the method comprising separating at least one of the multiple powered devices at least temporarily by a switching unit of the at least one of the multiple powered devices from a supply via the network.

7. The method according to claim 6, wherein separating the at least one of the multiple powered devices at least temporarily by the switching unit of the at least one of the multiple powered devices from the supply via the network is an initialization step at a start of the network or a part of the network.

* * * * *